US006675098B2

(12) United States Patent
Peek et al.

(10) Patent No.: US 6,675,098 B2
(45) Date of Patent: *Jan. 6, 2004

(54) CELLULAR WEATHER STATION AND COMPUTER SYSTEM USING THE PUBLIC CELLULAR DATA TELEPHONE SYSTEM AND INTERNET FOR CONTROLLING IRRIGATION AND METHOD OF USE

(76) Inventors: Sanford Christopher Peek, 1316 Lymric Way, Bakersfield, CA (US) 93309; David P. Peek, 13 Village Dr., Atkinson, NH (US) 03811

(*) Notice: Subject to any disclaimer, the term of this patent is extended or adjusted under 35 U.S.C. 154(b) by 110 days.

This patent is subject to a terminal disclaimer.

(21) Appl. No.: 09/976,183

(22) Filed: Oct. 12, 2001

(65) Prior Publication Data

US 2002/0029111 A1 Mar. 7, 2002

Related U.S. Application Data

(63) Continuation-in-part of application No. 09/498,314, filed on Feb. 6, 2000, now Pat. No. 6,343,255.

(51) Int. Cl.[7] .......................................... G06F 169/00
(52) U.S. Cl. ........................................................ 702/3
(58) Field of Search .................. 702/3, 4, 5; 700/284; 342/26; 709/218

(56) References Cited

U.S. PATENT DOCUMENTS 6,343,255 B1 * 1/2002 Peek et al. .................... 702/3

* cited by examiner

Primary Examiner—Donald E. McElheny, Jr.

(57) ABSTRACT

A system and method for accessing and displaying weather information are shown. A weather station (102) collects weather information data from sensors (108–114) using a collection program and assembles the data as a data string in a memory. A station access system (140) is used to call the weather station through the Internet (150) and a wireless cellular digital packet data system (154). The weather station downloads the weather data string to a data base (164). A user contacts the access computer through the Internet using his personal computer (170) to ask for the weather information. The information is compiled from the data base and transmitted to the user's display (172) over the Internet. A user such as a farmer can also supply the system with his particular field and crop conditions and the system will apply the conditions to the weather information and return customized crop production and control information to the farmer over the Internet.

6 Claims, 18 Drawing Sheets

FIG. 3
PRIOR ART

DAILY WEATHER SUMMARY

| ARVIN | | | | | | | | | | | |
|---|---|---|---|---|---|---|---|---|---|---|---|
| DATE | ET | T.MAX | T.MIN | T.AVG | W.AVG | W.GUST | W.DIR | SOLAR | HUMAVG | RAIN |
| 7/29/99 | 0.28 | 95 | 59 | 75 | 3.0 | 9 | 210 | 790 | 70 | 0 |
| 7/30/99 | 0.31 | 90 | 58 | 74 | 1.8 | 7 | 265 | 976 | 70 | 0 |
| 7/31/99 | 0.28 | 92 | 56 | 74 | 2.5 | 8 | 0 | 775 | 68 | 0 |
| 8/1/99 | 0.27 | 92 | 55 | 74 | 3.0 | 10 | 260 | 637 | 68 | 0 |
| 8/2/99 | 0.28 | 93 | 58 | 75 | 2.8 | 8 | 219 | 697 | 71 | 0 |
| 8/3/99 | 0.28 | 94 | 61 | 75 | 4.3 | 12 | 286 | 713 | 72 | 0.01 |
| 8/4/99 | 0.28 | 97 | 61 | 77 | 2.4 | 7 | 15 | 693 | 70 | 0 |
| TOTALS | 2 | 97 | 55 | 74.85 | 2 | 9 | | | 69 | 0.01 |

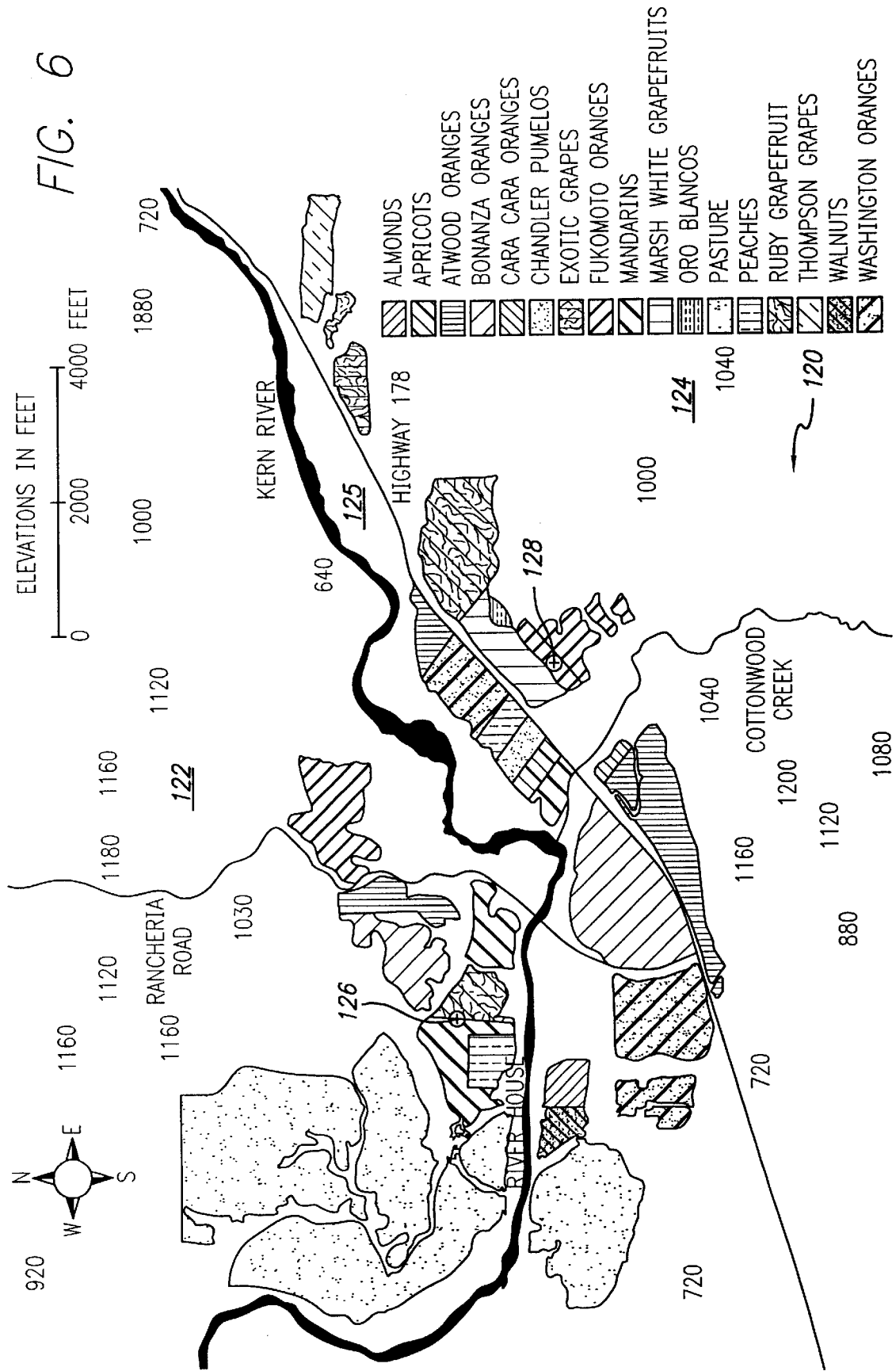

| BLOCK NAME | CROP NAME | CROP CONSTANT | STATION NAME |
|---|---|---|---|
| GRAPES 1 | GRAPES | .85 | MARICOPA FLATS |
| NAVEL 3 | ORANGES | .60 | MCFARLAND |
| NAVEL 4 | ORANGES | .60 | STRATHMORE |
| NAVEL 5 | ORANGES | .60 | MCFARLAND |
| NAVEL 6 | ORANGES | .60 | TERRA BELLA |

[|<] [<] [UP] [DWN] [>] [>|]

(USE BUTTONS TO MOVE YELLOW BAR. EDIT THE BLOCK IN YELLOW BELOW...)

| BLOCK NAME | CROP NAME | CROP CODE | CROP CONST | STATION |
|---|---|---|---|---|
| GRAPES 1 | GRAPES | | .85 | MARICOPA FLATS ▽ |

| GALLONS/TREE | # TREES | MAXMOISTURE |
|---|---|---|
| 1 | 450 | 1.5 |

*FIG. 7*

REQUIRED WATER/EFFECTIVE RAIN

MCFARLAND

| DATE | TEMP | WIND | SOLAR | HUMIDITY | ET | RAIN | NAVEL 3 | NAVEL 5 | NAVELS 6 |
|---|---|---|---|---|---|---|---|---|---|
| 7/14/99 | 88 | 0.0 | 737 | 54 | 0.32 | 0 | 0.19/0 | 0.19/0 | 0.27/0 |
| 7/15/99 | 82 | 0.3 | 765 | 53 | 0.31 | 0 | 0.18/0 | 0.18/0 | 0.26/0 |
| 7/16/99 | 76 | 0.3 | 761 | 59 | 0.28 | 0 | 0.16/0 | 0.16/0 | 0.23/0 |
| 7/17/99 | 74 | 0.3 | 778 | 63 | 0.28 | 0 | 0.16/0 | 0.16/0 | 0.23/0 |
| 7/18/99 | 75 | 0.0 | 777 | 56 | 0.28 | 0 | 0.16/0 | 0.16/0 | 0.23/0 |
| 7/19/99 | 73 | 0.8 | 764 | 51 | 0.28 | 0 | 0.16/0 | 0.16/0 | 0.23/0 |
| 7/20/99 | 70 | 0.0 | 785 | 64 | 0.26 | 0 | 0.15/0 | 0.15/0 | 0.22/0 |
| TOTALS FOR PERIOD | | | | | 2 | 0 | 1.2/0 | 1.2/0 | 1.7/0 |
| REQ. HOURS FOR PERIOD | | | | | | | 89 | 59 | 102 |

FIG. 8

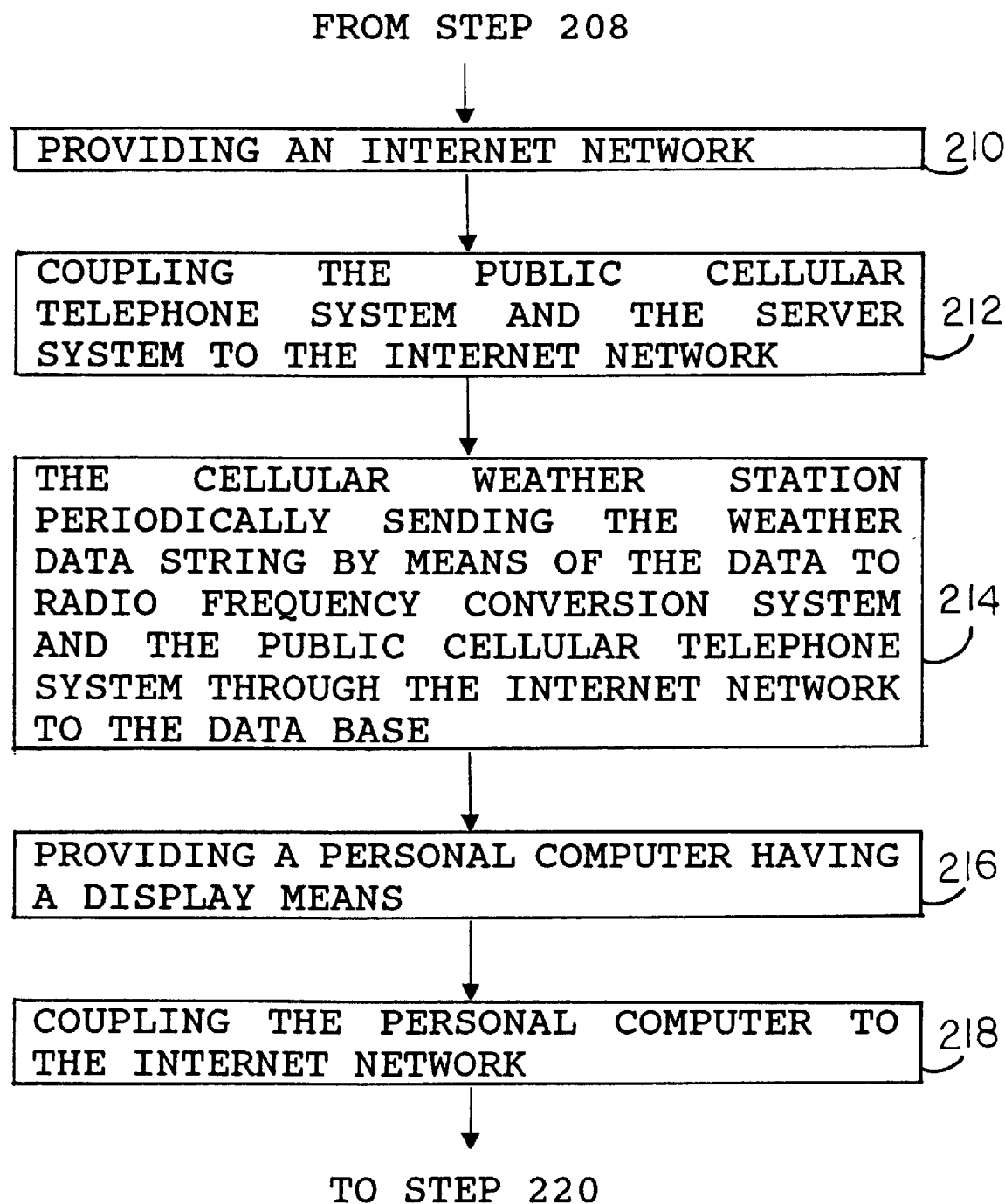

FIG. 12

$$\text{HOURS} = (\text{ETc} \times 27{,}160) \div [(\text{trees/acres}) \times (\text{gallons/tree/hour})]$$

all minus effective rain

WEATHER / EQUIPMENT PERFORMANCE DATA

MACFARLAND

| DATE | TEMP | WIND | SOLAR | RAIN | BLOCK TEMP | OXID. TEMP | SOIL MOIST | FLOW RATE |
|---|---|---|---|---|---|---|---|---|
| 7/14/01 | 89 | 0.0 | 738 | 0.0 | 1230 | 630 | 16 | 101 |
| 7/15/01 | 82 | 0.3 | 766 | 0.0 | 1250 | 633 | 20 | 110 |
| 7/16/01 | 76 | 0.3 | 760 | 0.0 | 1243 | 621 | 22 | 113 |
| 7/17/01 | 76 | 0.2 | 777 | 0.0 | 1191 | 610 | 31 | 111 |
| 7/18/01 | 75 | 0.1 | 776 | 0.0 | 1198 | 608 | 36 | 109 |
| 7/19/01 | 74 | 0.8 | 763 | 0.0 | 1280 | 591 | 17 | 120 |
| 7/20/01 | 71 | 0.0 | 785 | 0.0 | 1201 | 596 | 20 | 131 |
| MAXIMUM | 89 | 0.8 | 785 | 0.0 | 1280 | 633 | 36 | 131 |
| MINIMUM | 71 | 0.0 | 738 | 0.0 | 1191 | 591 | 16 | 101 |

Fig. 15

CELLULAR WEATHER STATION AND COMPUTER SYSTEM USING THE PUBLIC CELLULAR DATA TELEPHONE SYSTEM AND INTERNET FOR CONTROLLING IRRIGATION AND METHOD OF USE

CROSS REFERENCE TO RELATED APPLICATION

This application is a Continuation In Part of application Ser. No. 09/498,314, filed Feb. 6, 2000 now U.S. Pat. No. 6,343,255, which is included herein by reference.

TECHNICAL FIELD

The present invention relates generally to the field of transmitting information over the Internet, and more particularly to a method and system for providing weather information over the Internet using data supplied through the Internet and a wireless cellular digital packet data service.

BACKGROUND ART

Weather information has long been compiled from data from weather stations around the world. These weather stations are often located at major airports and universities where the equipment can be monitored. The raw data is brought together over telephone lines to a central location where it is processed into useful information. Maps are typically created summarizing the information for continents, nations, states, and portions of states. This general weather information is of use to most people who are planning their days and weather influenced companies such as airlines, shipping lines, and trucking companies which are planning their departures and routes over vast distances. General weather information is also of interest to farmers who operate in flat areas including the plains and prairies where they grow commodity crops such as wheat, corn, soybeans, and forage crops that are only minimally influence by the weather on any given day.

Farmers who operate in hilly regions, grow specialized crops, and/or depend upon irrigation can also use the macroclimate weather information to plan their general activities. But they can significantly improve their results if they have more specific weather information regarding their particular fields or microclimates. One well known use of specialized weather information is the reporting of freezing conditions which is used to determine the use of wind machines and smudge pots in citrus groves where a one degree difference can ruin a crop. Running the machines and pots every cold night would be too costly. Another situation where specialized weather information is useful is regarding crops that are entirely dependent upon irrigation. Too little irrigation over too long a period can destroy a crop or limit production. More than just enough irrigation to achieve the results desired is wasteful and expensive. Knowledge of exact weather conditions in the fields can help optimize the use of irrigation. In other situations, politicians have mandated that less water be used to irrigate crops. For example, in Ventura County, Calif., an ordinance was passed requiring a 20% decrease in water use by agricultural interests in certain water districts. The decreased amount of water is sufficient to grow the desired crops but it has to be husbanded carefully.

FIG. 1 is a map of an area in the San Joaquin Valley of central California between Bakersfield and Fresno having a multiplicity of microclimates and need for irrigation. Precise monitoring of these microclimates requires the placement of weather stations in the microclimates and transmission of data to a central location for processing into useful information. The bottom of the valley is flat and has an elevation ranging from 300 to 400 feet. To the west are the Coast Ranges which average 2000 to 3000 feet in height and to the east are the Sierra Nevada Mountains which average 8000 to 9000 in height. These elevation changes cause dramatic differences in microclimates depending upon exact location. Weather stations for monitoring some of these climates have been placed at Ivanhoe, Exeter, Lindsay, Strathmore, Terra Bella, Avenue 2, Blackwell's Corner, Rio Bravo, Arvin, Wheeler Ridge, and Maricopa. The locations of the weather stations are determined by where they are economically justified. Because the bottom of the valley is flat, weather conditions are substantially uniform allowing only two stations at Blackwell's Corner and Wheeler Ridge to suffice. Also, the bottom of the valley is planted in cotton and forage crops which do not require precise weather information. The weather information is therefore used primarily for the optimization of irrigation. Along the east side of the valley, the weather is chopped up into microclimates due to the variable terrain of the foothills of the Sierra Nevada Mountains. A variety of crops are also planted including grapes and fruit, nut, and citrus trees which have different temperature and irrigation requirements. The citrus trees are particularly susceptible to freezing with the possibility of an entire crop being destroyed in one night of cold temperatures. Several weather stations are therefore located along the foothills.

Each weather station indicated on FIG. 1 has a telephone line connected to the local telephone company. The requirement for a telephone line makes installation of a weather station expensive, limits a location to one near a telephone line, makes movement of a weather station difficult, and is expensive because each telephone call to a station is a long distance call. Because of the expense of calling, each station is typically called only three times a week. A computer in each station continuously records the weather information at the station. When the station is subsequently called, all data developed during the period after the previous call is downloaded in a few seconds. While this frequency of calling may be adequate for irrigation purposes, it is much less than is desirable for freeze warning purposes. During periods when freezes may be possible, the stations need to be called frequently. Additional stations would also be helpful because freezing conditions often tend to be highly localized. However, the number of stations must be limited because of the cost.

FIG. 2 shows a prior art hard wired weather information system 50 for reporting on microclimates. The system includes at least one weather station 30. A telephone line 32 runs either underground or on poles to an I/O (input/output) board inside a rainproof enclosure 34. Attached to the I/O board are a number of weather sensors including a wind direction indicator 36, wind speed anemometer 38, solar radiation sensor 40, sun shielded temperature sensor 41, tilting bucket rain gauge 42, and humidity sensor 44. A computer inside the enclosure processes the data from the input sensors into data that is stored in a data logger until the station is called and a download signal is given. Power is provided to the weather station from the local power grid through a wire 46.

An access computer 52 is programmed to request a dial tone, dial a telephone number, identify an answer by the weather station 30, and create a carrier detect signal that is sent over the telephone line 32 to the weather station 30. In response to the carrier detect signal, the computer in the weather station accesses its memory and downloads the data over the telephone line to the data storage section 54 of the access computer 52. After retrieving the data from one weather station, the access computer 52 continues down its list of other weather stations such as the ones in FIG. 1 collecting data from them one at a time in the same manner.

A system user can use his personal computer 60 to query the access computer 52 through a computer network 62 such as the Internet for any desired information. For example, he could ask for the most recent information from a particular weather station, a list of information for the past week, a list of information for the same week in the previous year, or any other form of useful information. The information is then presented on a display screen 64.

FIG. 3 is a sample of the daily weather information provided by the central computer from the weather station in Arvin as it would be displayed on the display screen 64 of the user's computer 60 including maximum, minimum, and average temperature in Fahrenheit degrees; average wind speed and wind gusts in miles per hour; wind direction in degrees with north at 0°; solar radiation in langleys (watts per square centimeter); average humidity in percent; and rain in inches.

The second column labeled ET is for the evapotranspiration rate in inches of water per day at the station. Evapotranspiration is the loss of water from the soil both by evaporation from the surface and by transpiration from plants growing on the soil. The plant used to compute standard ET is grass two inches tall. For example, on Aug. 3, 1999, grass two inches tall required 0.28 inches of water to maintain normal growth because of the temperature, humidity, and solar radiation at that exact location on that day. Each crop has a different water requirement for normal growth defined as a crop constant which is stated as a percentage of the standard ET. Empirical studies have determined the following crop constants: almonds 100%, grapefruit 75%, grapes 85%, and oranges 67%. For example, if grass requires 0.30 inches of water on a day, oranges will require 67%×0.30=0.20 inches of water on the same day. This moisture can come either from irrigation or rain. If rain has occurred in the past twenty-four hours, the amount of rain is determined by the rain gauge 42 and the farmer subtracts it from the total required. For example, if 0.20 inches of water are required and 0.02 inches of effective rain have fallen in the past twenty-four hours, the farmer would irrigate his crop with 0.18 inches of water that day. The access computer 52 computes the ET values shown in FIG. 3 from the other weather data using a proprietary algorithm.

While current hard wired systems are able to provide a farmer with information on microclimates which he can use to control irrigation and control other production functions, communication between the access computer and the weather stations is expensive. Therefore, the farmer is less likely to install new stations or receive weather data as often as he would like, especially for frost protection purposes. Furthermore, the farmer usually either develops or buys software programs or uses manual calculations to apply weather station data to his specific irrigation and crop field configurations. This requires data processing or calculation expertise which he may not have. Consequently, a need exist for improvements in methods and systems for providing information from microclimate weather stations.

DISCLOSURE OF INVENTION

The present invention is directed to a system and method for accessing and displaying weather information. A weather station collects weather information data from sensors using a collection program and assembles the data as a data string in its memory or separate data logger. An access computer system periodically calls the weather station through the Internet and a wireless cellular digital packet data system. The weather station transmits the weather data string to a data base. A user contacts the data base through the Internet using the user's personal computer to ask for the weather information. The information is compiled from the data base and transmitted to the user's display over the Internet.

In accordance with another preferred embodiment of the invention, the user causes an access computer function to call the weather station at intervals between the normal periodic calls made by the access computer system by transmitting this request through the Internet from the user's personal computer.

In accordance with another preferred embodiment of the invention, the user sends the user's crop and field configurations to the data base through the Internet. The server system combines the crop and field configurations with the weather information and returns customized crop production and control information through the Internet to the user.

In accordance with another preferred embodiment of the invention, a wireless digital cellular hand held computer having a display is used and the information is displayed on the display.

In accordance with another preferred embodiment of the invention, the access computer has a computer generated voice. The user dials the access computer with a standard telephone. The keys of the telephone are used to enter codes into the access computer to request specific weather information and the access computer replies by way of the computer generated voice over the telephone.

In accordance with an important feature of the invention, the user enters a request for notification of a desired condition into the access computer. The access computer sends a page to a pager when the preexisting condition is reached which notifies the user of the condition such as a freezing temperature.

Other features and advantages of the present invention will become apparent from the following detailed description, taken in conjunction with the accompanying drawings, which illustrate, by way of example, the principles of the invention.

BRIEF DESCRIPTION OF DRAWINGS

FIG. 3 is a sample display of the daily weather information provided by the access computer from a weather station;

FIG. 6 shows two weather stations installed on a single farm;

FIG. 7 is a sample display of a particular farmer's crop and field configurations as sent to the weather information system;

FIG. 8 is a sample display of customized crop production and control information provided in return by the weather information system to the farmer for use in controlling his specific crops; and, FIG. 9 is a flow chart illustrating the steps in a method of using a cellular weather station and computer system using the public cellular data telephone system and Internet for controlling irrigation;

FIG. 12 is an algorithm used in the system and method;

FIG. 15 is similar to FIG. 8 showing equipment variables;

MODES FOR CARRYING OUT THE INVENTION

Figure 4:
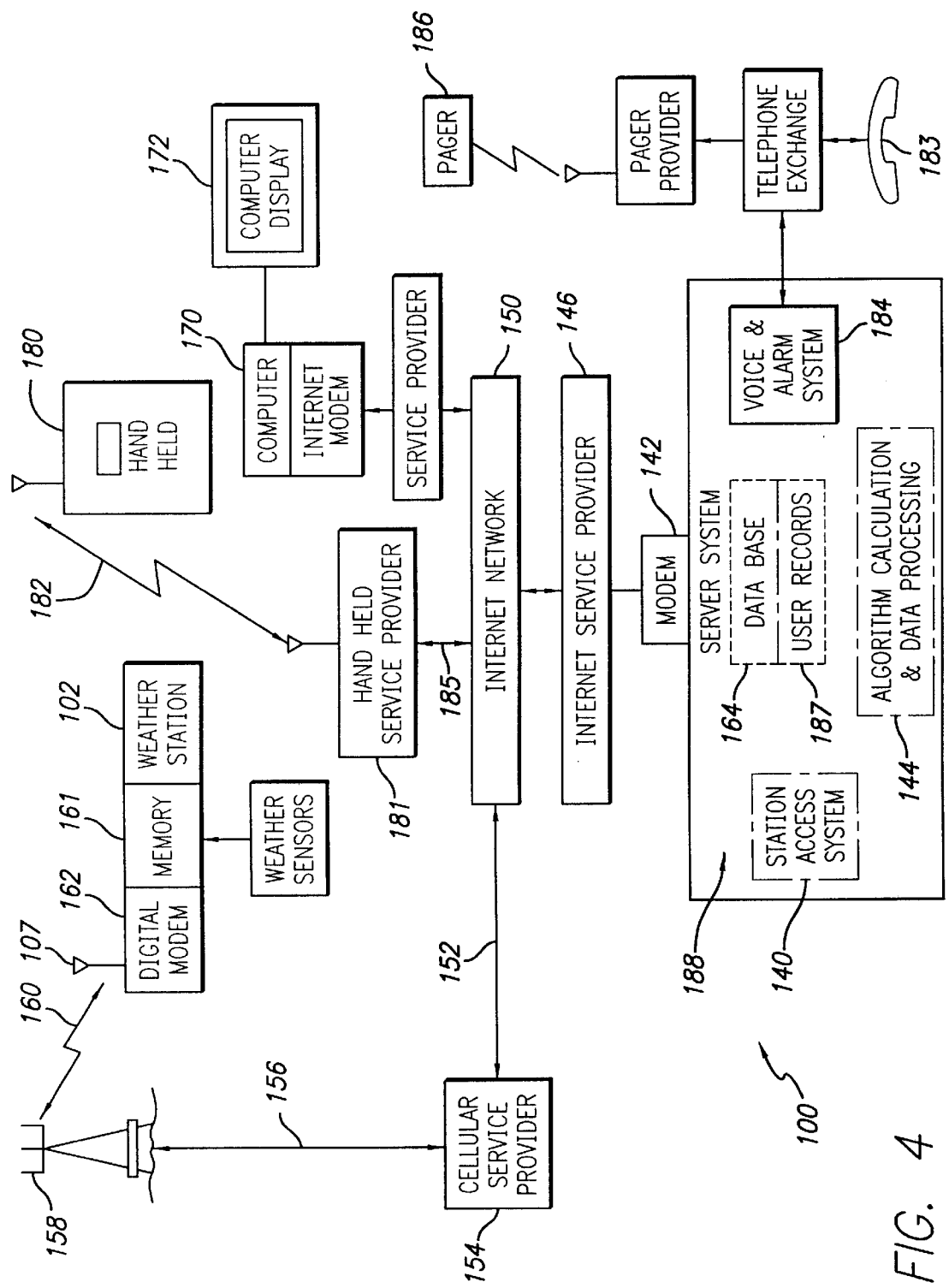
FIG. 4 illustrates a system for providing weather information over the Internet using data supplied through the Internet and a wireless cellular digital packet data service.

Referring initially to FIG. 4, there is illustrated a system for providing weather information over the Internet using data supplied through the Internet and a common carrier wireless cellular data service such the wireless cellular digital packet data service provided by General Telephone in accordance with the present invention, generally designated as 100.

Figure 2:
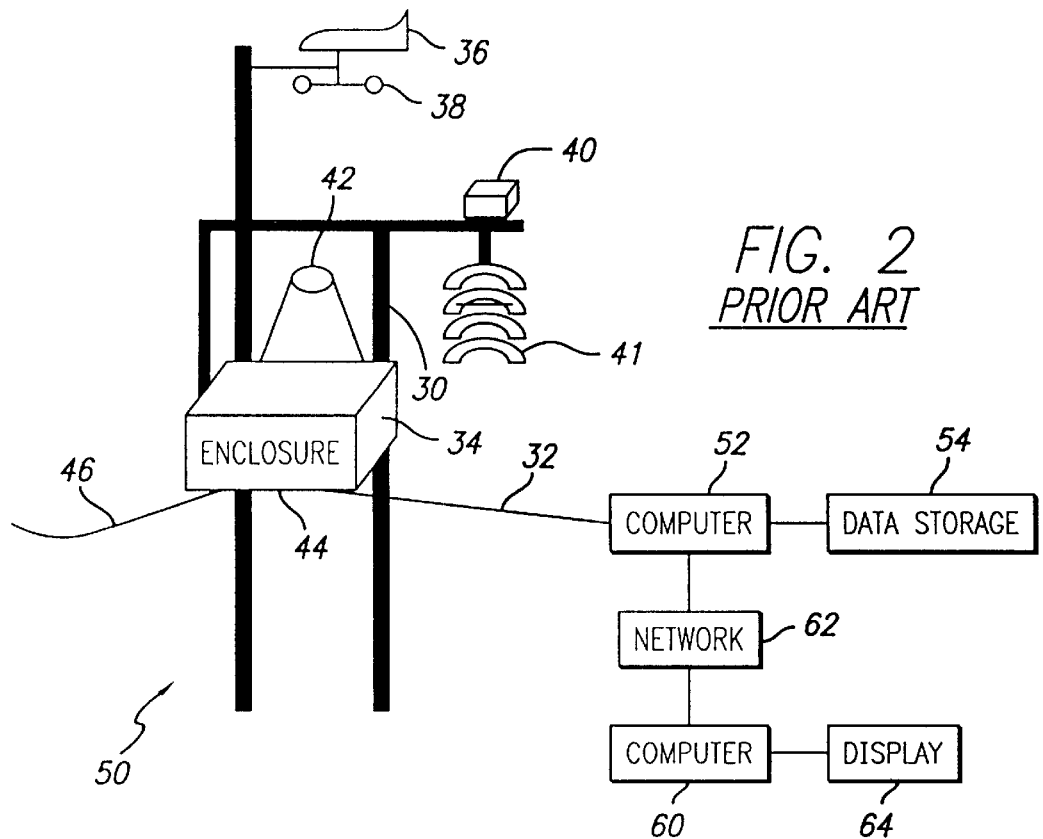
FIG. 2 shows a prior art hard wired weather information system for reporting on microclimates.
Figure 5:
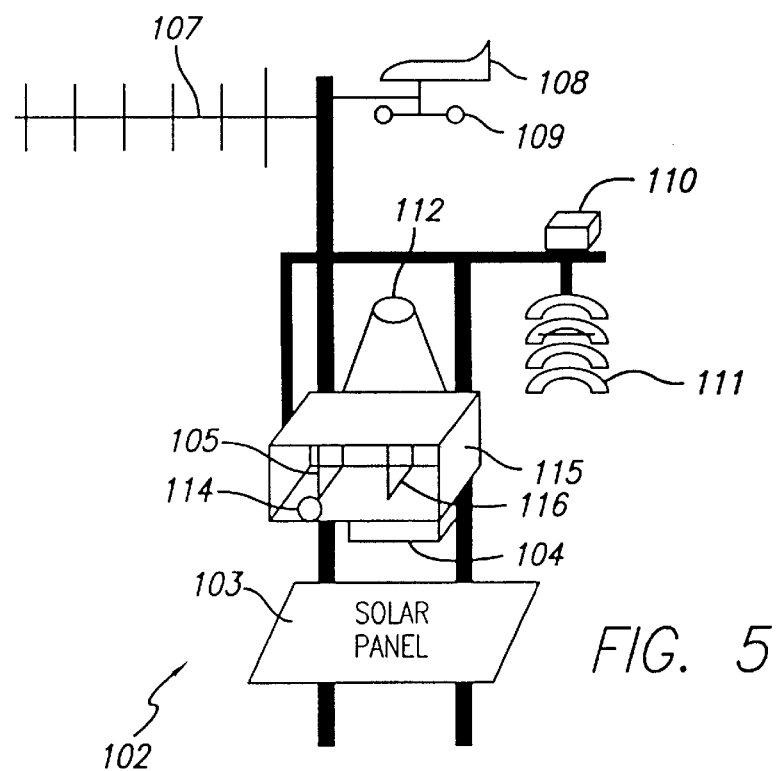
FIG. 5 illustrates a weather station having a wireless cellular digital packet data service connection.

FIG. 5 shows a weather station 102 configured to operate within the weather information system 100. The weather station 102 is similar to the prior art weather station 30 of FIG. 2 to which are added a solar panel 103, a battery 104, a data to radio frequency conversion system such as cellular digital packet modem 105, and a cellular telephone antenna 107. These additions make the weather station 102 entirely portable. Since weather information is most valuable if it is at the exact location of interest, a farmer can move the station 102 as needed to provide optimal benefit. For example, one year a field may be left fallow and the farmer will move the station to a field that is in use. Or a field may have a crop in a portion of a growing cycle requiring immediate information such as freezing conditions in a citrus grove. The farmer can then move a station into the grove. After the citrus crop is harvested, the farmer can move the station to another crop which is of more interest.

Data from a wind direction indicator 108, wind speed anemometer 109, solar radiation sensor 110, shielded temperature sensor 111, tilting bucket rain gauge 112, and humidity sensor 114 are compiled and recorded as weather data strings in the memory of a micro processor computer 116 or separate data logger inside a rainproof enclosure 115 of the weather station 102 using a collection program. Other sensors may be added to monitor the specific conditions in the particular field and/or adjacent fields. For example, soil moisture sensors of the gypsum type can measure soil moisture at various root depths, a series of flow meters can be added to the irrigation pipes to measure the timing and quantity of water delivered to the crops, leaf wetness sensors can measure the moisture on leaves, chemical sensors can measure fertilizer levels, and pH meters can measure pH levels in the soil. These additional sensors can supply the weather station 102 with data for entry into the memory either through hard wires or short range radios. One advantage of radios is that they allow the sensors to be readily moved about as conditions change during the growing season.

FIG. 6 illustrates weather stations 102 installed on a single farm 120 located in the foothills with a ridge 122 to the north having elevations greater than 1000 feet and another ridge 124 to the southeast also with elevations greater than 1000 feet. The bottom 125 of the river valley through the farm ranges from 600 to 700 feet. A first weather station 126 is located at 600 feet in the center of the farm. Another weather station 128 is located at 700 feet adjacent the southeast ridge 124. The purchase and positioning of weather stations is entirely dependent upon economics. Generally, the less expensive the stations become, the more stations the farmer will decide to purchase or have installed. In the present situation, the farmer has determined that a second weather station is warranted even though the first weather station is located within 6000 feet of the first station. The reason is that the microclimate surrounding the second station is sufficiently different from the climate around the first station that the information provided by the first station has only limited value in the area of the second station. Whether or not a second station is actually installed is determined by the added value of the crops produced in the second area as a result of the information provided by the second weather station. Generally, the data from the first station is sufficient for most of the farm. The second station provides information on the microclimate backed up against the southeast ridge and also corroborates the data from the first station.

Figure 1:
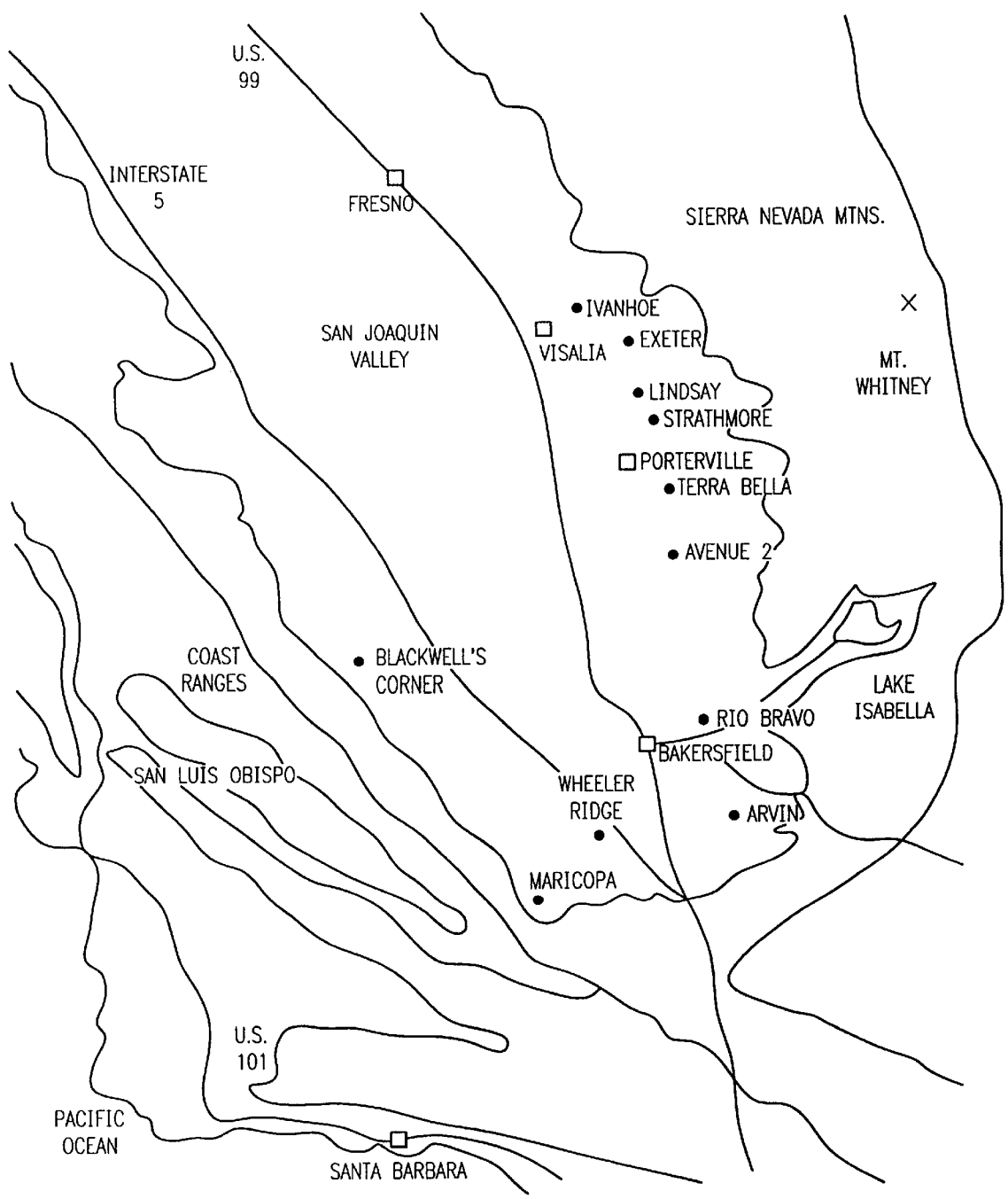
FIG. 1 is a map of an area in the San Joaquin Valley of central California having many microclimates.

Even in the limited area shown in FIG. 6, the farmer will find it more convenient to use a weather information system 100 of the present invention rather than install a hard wired system because he can readily move the weather stations around as desired and he can let someone else take care of the system. Also he can still access information from other weather stations further away from his farm if needed. But generally, he will ask for information only from weather stations 126 and 128 because they are most relevant to his situation. In contrast, a farmer in a more open area of the valley such as shown in FIG. 1, can use a more remote preexisting station by contracting with the weather information system 100 without having to have stations installed on his property.

As shown in FIG. 4, communication between a server system 188 and the weather station 102 has six links: 1. a modem 142 or other network connects to an Internet service provider 146; 2. the service provider uses a hard wire connection to the Internet network 150; 3. the call is routed through the Internet 150; 4. a second hard wire or fiber optic cable 152 carries the call to a common carrier wireless cellular digital packet data service (CDPD) 154 such as provided by General Telephone; 5. the CDPD service transfers the call by a third hard wire or fiber optic cable 156 to its antenna 158; and, 6. the CDPD service sends the call by a radio signal 160 to the antenna 107 of the weather station's digital modem 162. Upon receiving an access signal from the station access system 140, the weather station computer 116 identifies the access signal and downloads a string of data from its memory 161 through a digital packet modem 162 in the reverse direction where it is recorded in a data base 164. A digital packet modem such as the Air Link Raven Model 9700 modem made by Air Link Communications of San Jose, Calif., can be used.

When a farmer wants to use this information and the information from the other relevant weather stations, he uses a user display means such as his personal computer 170 to call the server system 188 over the Internet 150. The server system uses a compilation program to compile the information requested by the farmer from the data base 164. This information is presented on the display 172 of the farmer at his personal computer 170. The farmer can also request new information from the weather station 102 at any time through the weather information system 100. For example, during unusual situations such as possible freezing temperatures, the farmer can ask the system to report temperatures every few minutes. The farmer can cause the station access system to update the data from the weather station of interest by sending the request for this real time information from his personal computer 170 to the station access system 140 through the Internet 150 and the server system 188.

Farmers need to spend time in the field inspecting irrigation systems, crop disease conditions, and soil conditions. They are reluctant to spend much of their time at a computer keyboard. Therefore in another embodiment, the system does the calculation and computer data processing required allowing the farmer to spend his time in the field and on other farming operations. Before such data processing can be accomplished, however, the farmer's crop and field configurations must be available to the server. This is accomplished by the farmer sending his field and sprinkler configurations to the user's records systems 187 by using his computer 170, the Internet communication system, and the server system 188, as described above. For example, the farmer sends the data on his irrigation block including the crop type and the sprinkler gallons per hour per tree or vine to his private table on the user records system 187 within the server system 188.

FIG. 7 illustrates a sample display of the type of data sent regarding the crop and field configurations for a particular farmer and is shown as actually seen by the farmer on his computer display 172 (FIG. 4). The first column of the upper table shows the block name; the second the crop type; the third the crop constant; and the fourth the weather station nearest the block for which data is requested. The bottom table allows the farmer to modify the configurations at his discretion. For example, the bottom table is shown as accessing the information regarding the top crop line of the upper table with the entries being identical. Additional information is entered on the bottom line of the bottom table. Each vine ("tree") requires 1 gallon per day. There are 450 vines ("trees") per acre. The maximum moisture entry is used in conjunction with rainfall. In the current example, all rainfall which exceeds 150% of the average required water merely runs off and is lost. It therefore is not effective and is not included in the calculations. This algorithm is done by the server system and results in the proper amount to be subtracted from the crop ET to provide the proper amount of water the block used per acre for that crop.

It is not necessary to apply an ideal amount of moisture each day. The soil acts as a sponge retaining moisture from day to day. Typically, a farmer decides on Monday how much moisture he wants to apply to a field for the whole week. He then divides the number of total hours by the number of days he wants to run the system. He can also vary the number of hours on any particular day. For example, he may decide to run the system one day, every other day, every day, or some other combination of days. He can also decide to water the same number of hours each watering day or more hours on one watering day and less on another watering day. What is important is that over the week or other period of watering, the plants receive just enough water to achieve optimal growth without too much extra.

FIG. 8 is a sample display of the customized crop production and control information provided in return to the farmer over the Internet from the server system for use in controlling his specific crops. After the configuration data of FIG. 7 is downloaded to the user records system 187, the algorithm calculation and data processing system within the server system calculates the hours of irrigation needed to replace the water used by the crop during the previous period. The farmer in the sample is using a one week period. He decides exactly how he wants to irrigate his crops based on what happened the previous week. The most important numbers are shown in the bottom two lines. For example, his block of Navel 3 orange trees received 1.2 inches of irrigation water over the previous week and no rain. In order to apply the same amount of water over the week to come, he will have to operate his irrigation system in the Navel 3 block for a total of 89 hours. He can divide up this 89 hours over the seven days in any manner that is convenient for him. For example, he could apply the same amount of water each day by dividing by 7 for an average of about 13 hours a day.

In contrast, the number of hours required for the block Navel 5 is 59 hours total and the number of hours for the block Navel 6 is 102 hours. The differences are cause by the configurations of the irrigation systems in the different blocks. Some apply more water per hour and some apply less. How much water a given irrigation system applies in a particular block is entered into the calculation in another data table for the block that is not shown.

All of the other information on FIG. 8 is helpful to the farmer in allowing him to understand exactly what is happening but is not essential. The date of each line is given in the left column. The four components of ET are shown in the next four columns with ET shown in the sixth column. Generally, the weather was cooling off during the week with a corresponding decrease in the amount of irrigation water required. The seventh column shows that there was not any rain. The last three columns show how much water should have been applied to each of the crop blocks for each day with the irrigation component given on the left and the rain component given on the right. There has been no rain so all of the rain components are "0." Therefore, looking down the Navel 3 column only, on July 14, 0.19 inches of irrigation water were required by this particular crop on this day to replace the water used by the crop. On July 15, 0.18 inches of irrigation water were required. For the whole week, 1.2 inches of irrigation water were required (ETc, i.e., ET for the particular crop). These numbers do not represent the amounts of water the farmer actually applied on those days. They are the ideal amounts he should have applied given the weather conditions. The hours needed, i.e. 89 hours, to actually achieve this level of irrigation is given at the bottom and is calculated by the algorithm: hours=(ETc×27,160)÷[(trees/acre)×(gallons/tree/hour)] all minus the effective rain.

This all means that a farmer can determine how many hours to irrigate each week (or other period) in order to replace the water used by each block without having to make any complicated calculations. He only has to compare the amount of water applied each week with what was used by the crop to determine if he is behind or ahead of what is needed. Thus the farmer has an interactive relationship with the server system which accesses data from the relevant weather stations, creates a data base containing current and historical weather data, records the farmer's irrigation blocks and crop configurations, combines these two sets of data, calculates the irrigation times and other crop production parameters, and makes the results available to the farmer through the Internet.

Alternatively, the farmer can connect to the server system 188 using a hand held computer 180 (FIG. 4) as a user display means having a digital radio frequency communication capability such as a Palm VII computer sold by Palm Computing, Inc. of Santa Clara, Calif. A cellular digital signal 182 from the hand held computer 180 travels to the hand held provider 181 and then through the Internet 150 to the server 188 and data base 140. The Palm VII displays the resulting data in a limited format specifically directed to a particular field, crop, or condition.

The farmer can also call a special number through the local telephone provider using either a telephone 183 or cellular telephone which connects to the voice and alarm systems 184. The keys on the telephone are then used to dial code numbers which cause the voice system to compile the desired information using the data base 164 and download the information to the caller in audio format over the telephone as an alternative user display means. A suitable synthesized computer voice module is sold by Dial Logic of Parsippany, N.J. The connection to the audio output of the voice system 184 is particularly helpful for monitoring freezing conditions and controlling other crop production operations when the farmer is out in the field. For example, the access computer can keep track of the current weather conditions and the amount of irrigation water applied up to the query time and then tell the caller how much time remains for the valves to stay open to complete the irrigation needed.

When information on only a particular event is required, a pager 186 can be used as another alternate user display means. Prior to going out into the field, the farmer can use his computer 170 or telephone 183 to tell the access computer to send a signal to his pager 186 when a particular event occurs. For example, the access computer could be directed to send a signal to a pager only when a freezing temperature has been reached. Or real time temperatures can be continuously displayed on the display screen of the pager identifying the value of the variable as well as previous values.

Figure 9:
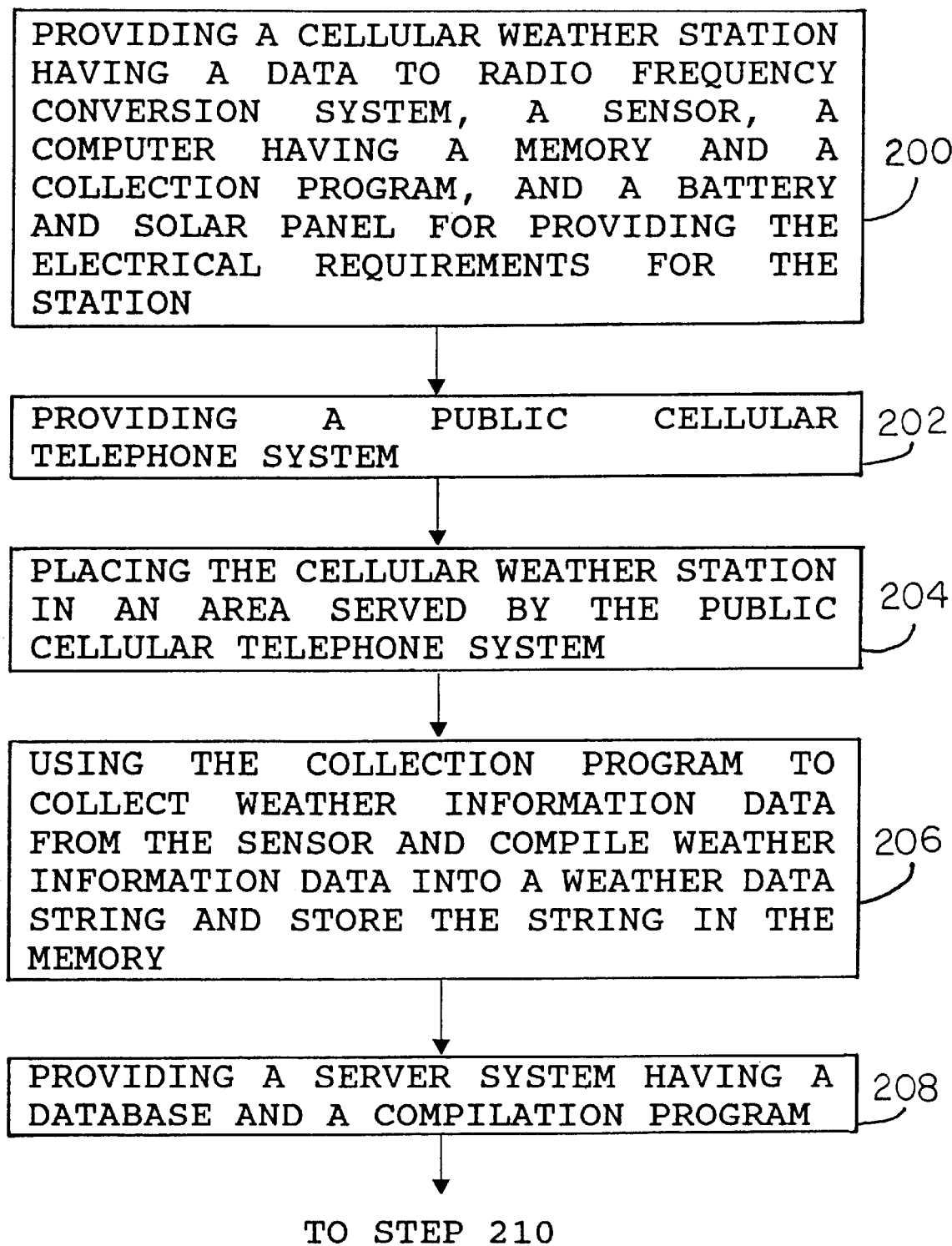
Figure 9B:
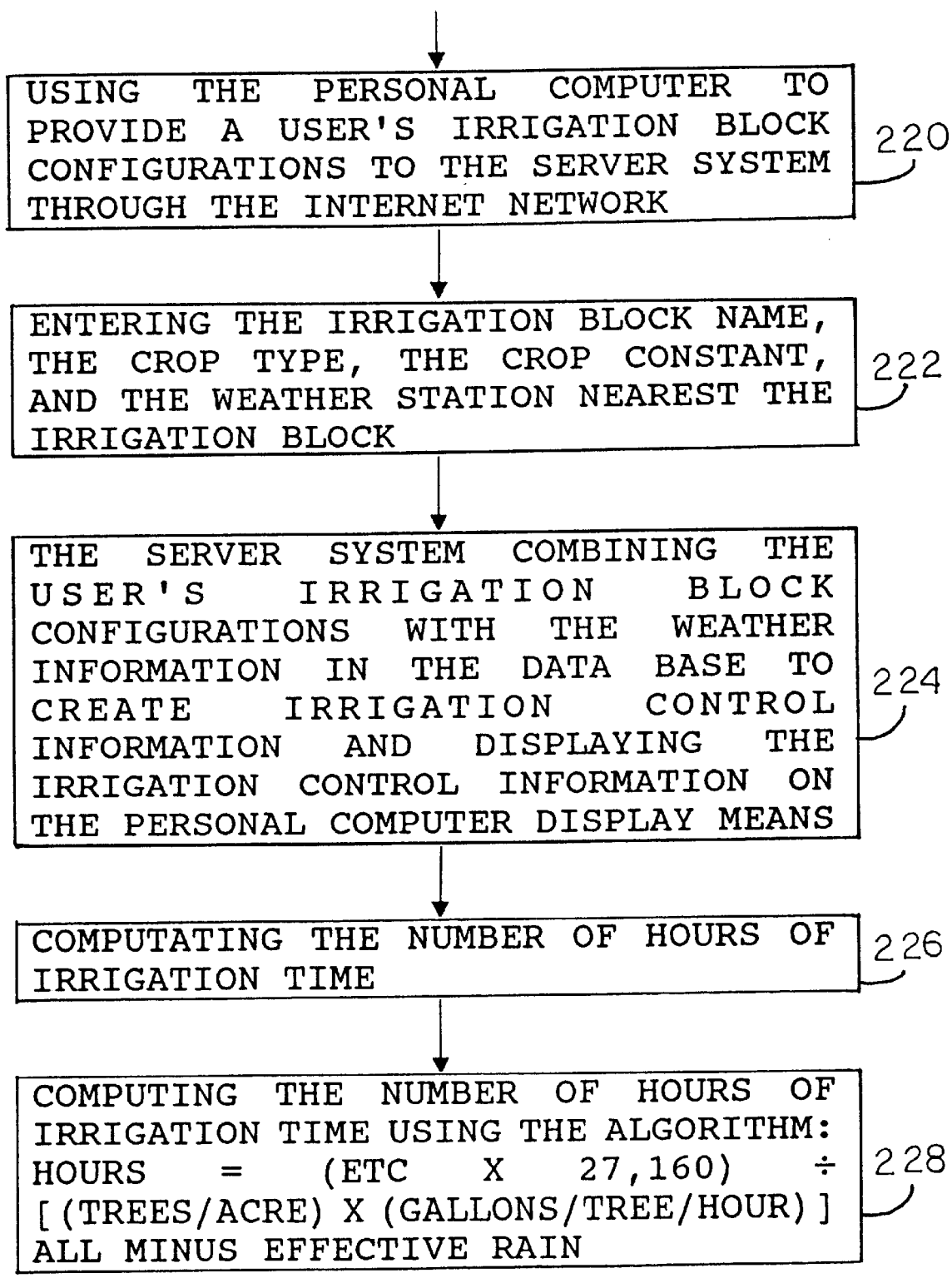

FIG. 9 is a flow chart illustrating the steps in a method of using a cellular weather station and computer system using the public cellular data telephone system and Internet for controlling irrigation. A cellular weather station is provided in step 200 having a data to radio frequency conversion system, a sensor, a computer having a memory and a collection program, and a battery and solar panel for providing the electrical power requirements for the cellular weather station. A public cellular telephone system is provided in step 202 and the cellular weather station is placed in step 204 in an area served by the public cellular telephone system. The collection program is used to collect in step 206 weather information data from the sensor and compile it into a weather data string and store the string in the memory. A server system is provided in step 208 having a data base and a compilation program. An Internet network is provided in step 210 and the public cellular telephone system and the server system are coupled in step 212 to it. The cellular weather station periodically sends in step 214 the weather data string by means of the data to radio frequency conversion system and the public cellular telephone system through the Internet network to the data base. A personal computer is provided in step 216 having a display. The personal computer is coupled in step 218 to the Internet network. The personal computer is used in step 220 to provide a user's irrigation block configurations to the server system through the Internet network. The user's irrigation block configurations are entered in step 222 including the irrigation block name, the crop type, the crop constant, and the weather station nearest the irrigation block. The server system combines in step 224 the user's irrigation block configurations with the weather information in the data base to create irrigation control information and displays the irrigation control information on the personal computer display means. The step of combining the user's crop and field configurations with the weather information to create irrigation control information includes computation in step 226 of the number of hours of irrigation time. The number of hours of irrigation time is computed in step 228 using the algorithm: hours=(ETc×27,160)÷[(trees/acre)×(gallons/tree/hour)] all minus effective rain. See FIG. 12.

Figure 10:
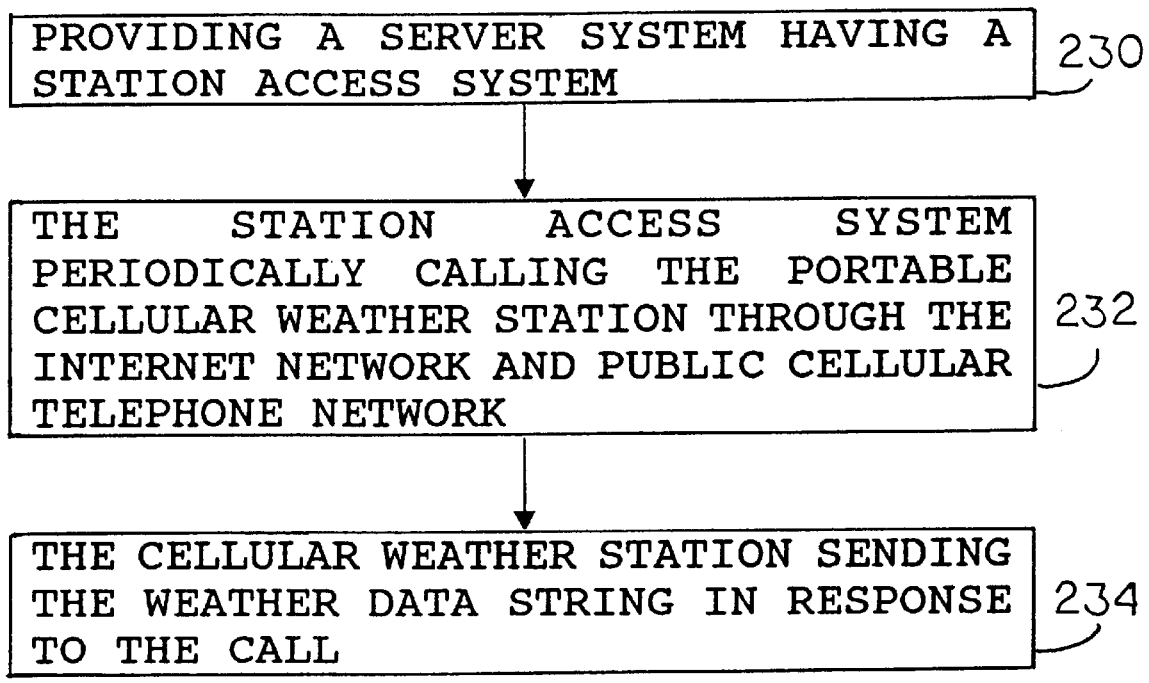
FIG. 10 is a flow chart illustrating the steps in another method for obtaining weather data from the cellular weather station.

FIG. 10 is a flow chart illustrating the steps in another method for obtaining weather data from the cellular weather station. The server system is provided in step 230 with a station access system. The station access system periodically calls in step 232 the portable cellular weather station through the Internet network and public cellular telephone network. The cellular weather station sends in step 234 the weather data string in response to the call.

Figure 11:
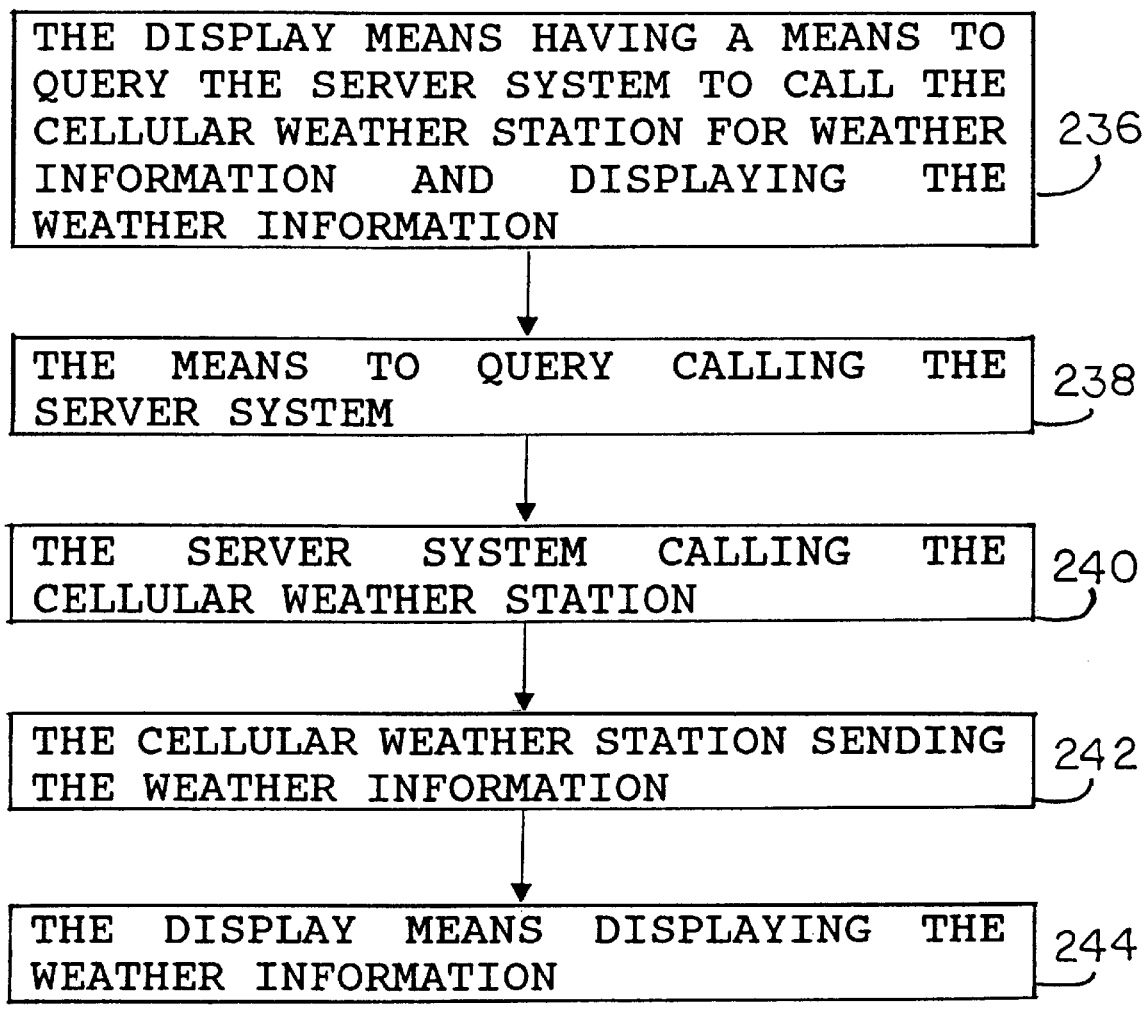
FIG. 11 is a flow chart illustrating the steps in yet another method for obtaining weather data from the cellular weather station.

FIG. 11 is a flow chart illustrating the steps in yet another method for obtaining weather data from the cellular weather station. The display means of the personal computer is provided with a means to query in step 236. The means to query calls in step 238 the server system. The server system calls in step 240 the cellular weather station. The cellular weather station sends in step 242 the weather information to the display means. And the display means displays in step 244 the weather information.

Figure 13:
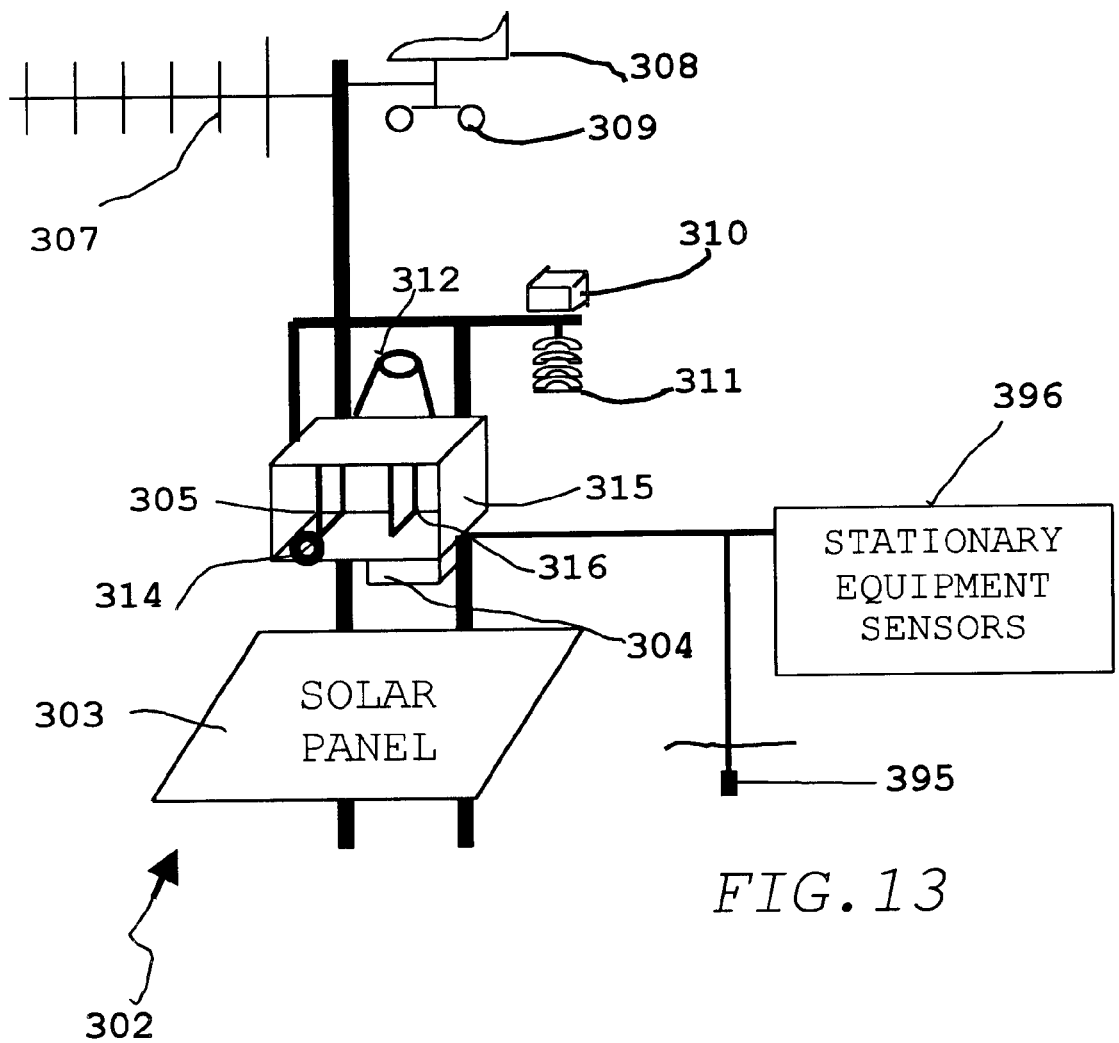
FIG. 13 is similar to FIG. 5 showing a weather station having an equipment reporting capability.

FIG. 13 shows the addition of sensors to a weather station 302 similar to weather station 102 shown in FIG. 5. The weather station computer 316 has the capability of monitoring more than just weather sensors. For example, it can process signals from a soil moisture sensor 395 and from stationary equipment sensors 396 and store the data strings in a computer memory 316 and then transmit them to the user through a cellular digital modem 305 and the Internet in the same manner as in the embodiment shown in FIGS. 4–8.

Farming is usually a low margin business. Farm employees are expected to use their time efficiently. Efficient farms usually make significant capitol investments in equipment designed to keep their labor and equipment maintenance costs as low as possible. If expensive equipment breaks down unexpectedly, overall efficiency is negatively affected. Therefore, preventative maintenance and careful monitoring of equipment is important.

The additional sensors added to weather station 302 provide an opportunity for the user to monitor the performance of certain pieces of stationary equipment. Examples are water pumps, electrical generators, water chillers, ground water purifiers, soil moisture measurement equipment, equipment for eliminating scale in water applications, and packinghouse storage facilities. In addition, the system can provide weather information so that maintenance plans can be scheduled in accordance with weather considerations.

Although irrigation can be scheduled using ET and hours needed as shown in FIG. 8. The farmer also needs to confirm that water was actually applied when and in the amounts scheduled. The farmer accomplishes this by making manual soil moisture measurements that require expensive visits to the field. If the soil moisture can be measured and reported to the farmer over the Internet and displayed on his computer's display device, this will confirm that the proper amount of water was provided at the proper time.

Figure 14:
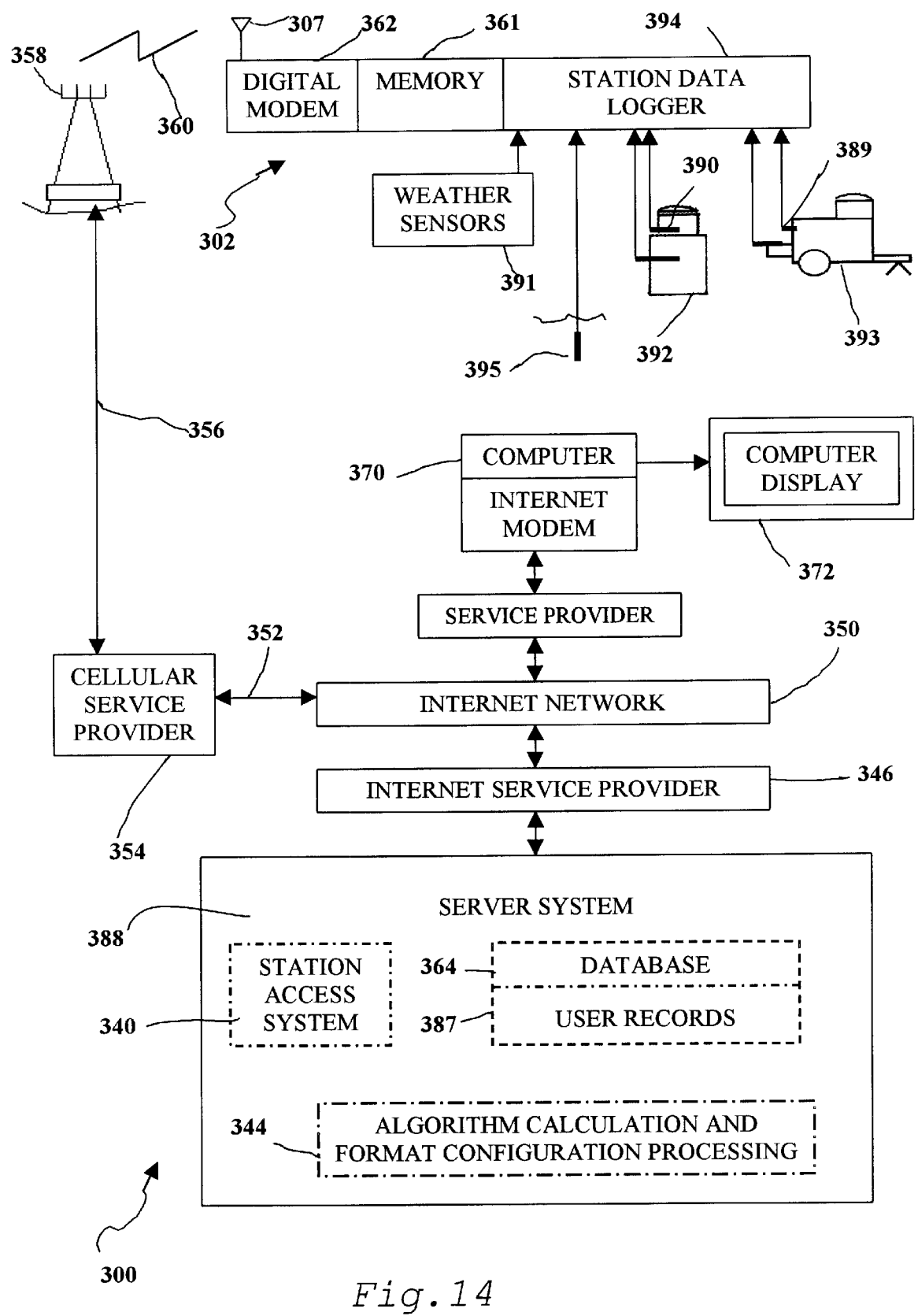
FIG. 14 is similar to FIG. 4 showing a system for providing equipment information as well as weather information over the Internet.

FIG. 14 is similar to FIG. 4 showing a system for providing equipment information as well as weather information over the Internet, generally designated as 300. The weather station 302 has the additional function of a data logger for receiving signals from stationary equipment such as an oxidizer 392 and diesel engine water pump 393. The soil moisture sensor 395 is coupled to the station data logger 394. There are many circumstances where electrical power is not a practical means for running water pumps. Portable diesel powered pumps are often used in these cases. Growers and other users carefully monitor the performance of these machines by manually observing the pump's instruments. This again is an expensive and labor consuming process. Signals from redundant sensors 389 that can be attached to the pump 393 and processed by the station data logger 394 are displayed on the user's computer display 372. The pump's reliable performance can, therefore, be determined remotely without the need for expensive visits to the site.

A further application would be for catalytic oxidizers that are used to reduce hydrocarbon contaminants in ground water without contaminating the air. Signals from redundant sensors 390 attached to the oxidizer machine 390, are processed by the station data logger 394 and sent to the user's computer display so that the equipment's performance within specifications can be determined by the user as well as regulatory agencies.

The communication process for equipment in FIG. 14 is essentially the same as for the weather data system described for FIG. 4 and is adopted by reference. There are a few different functions required to process the additional data from the new sensors. In FIG. 4, the user sent his irrigation block configurations to his private table on the user records system 387. The data was formatted in a standard format shown in FIG. 8. With the addition of new sensors, the data format may no longer be of a standard configuration. An addition to the new system allows the user to choose his own configuration from a number of potential configurations and store his choice in the user records 387 within the database system 364. Data collected from all the sensors is stored in the station data logger's memory 361 and sent periodically through the various communication links to the database 364 in the manner described in FIG. 4. When the user requests data through his computer 370, the server system 388 uses the algorithm calculation and format configuration processing system 344 to combine the user's format configuration with the data from the database 364 to send the requested data in the requested format through the Internet network 350 to the user's computer 370 and computer display device 372 in the manner described in FIG. 4.

FIG. 15 illustrates how four equipment performance variables can be displayed on a computer display system providing the farmer or any other user an opportunity to monitor the performance of remote equipment so that maintenance can be done prior to equipment breakdown thereby avoiding expense repairs. FIG. 15 is similar to FIG. 8 but four irrigation related columns in FIG. 8 have been replaced by equipment performance variables in FIG. 15. The sixth column titled "BLOCK TEMP" shows the average block temperature of a diesel engine for each day. If the temperatures become too low or high, maintenance is suggested. These temperatures can also be displayed more often such as every half hour. The two bottom rows of data show the maximum and minimum values during the period for each variable.

The column marked "OXID TEMP" illustrates how an oxidizer machine is performing in relation to EPA (Environmental Protection Agency) specifications for this class of equipment. In this illustration, temperature readings below 600 degrees could cause the local air to become contaminated by hydrocarbon gases that were not properly oxidized by the machine. Note that this limit was violated for the dates Jul. 19, 2001 and Jul. 20, 2001. This would require the user to go to the site and perform maintenance. The temperature on Jul. 17, 2001 could have provided a warning that the temperature was approaching the limit.

The column marked "SOIL MOIST" illustrates how a user could keep track of his irrigation schedule. Note the soil was irrigated on Jul. 19, 2001 as determined by the soil moisture tensiometer readings going from the dry 36 centibars to a wet 16 during that day. The last column shows the gallons per hour flow rate for a water well pump.

Figure 16:
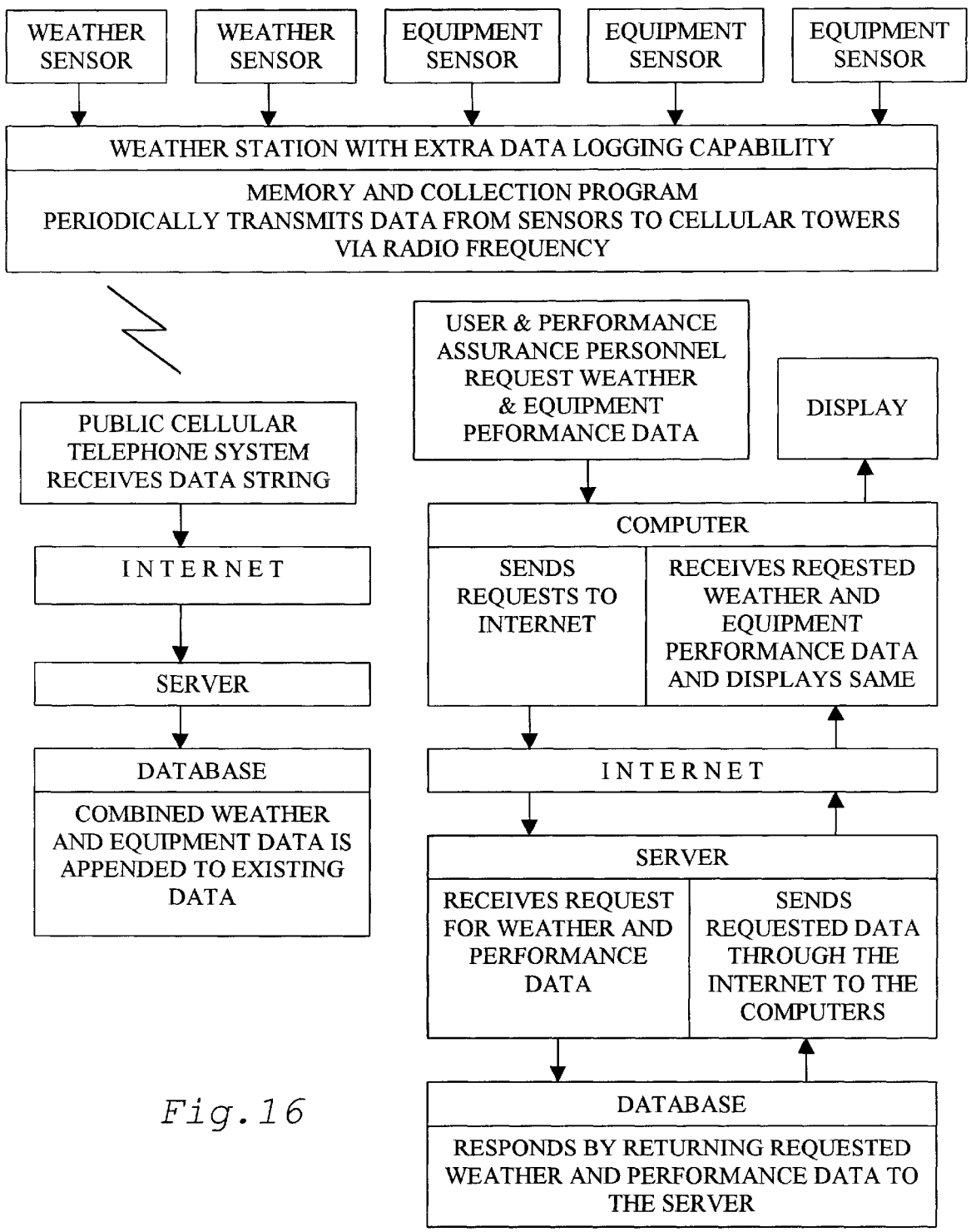
FIG. 16 is a flow chart that shows the flow of data through the Internet system and other communication links of FIG. 14; and, FIG. 17 is a flow chart that shows how the user selects his desired data format configuration using the system of FIG. 14.

FIG. 16 is a flow chart that shows the flow of data through the Internet system and other communication links of FIG. 14. At the top and left side of the figure, the flow of data from the sensors and station data logging system is shown proceeding through the communication links to the database. The right side shows the request from the user for the data that is returned to his computer display.

Figure 17:
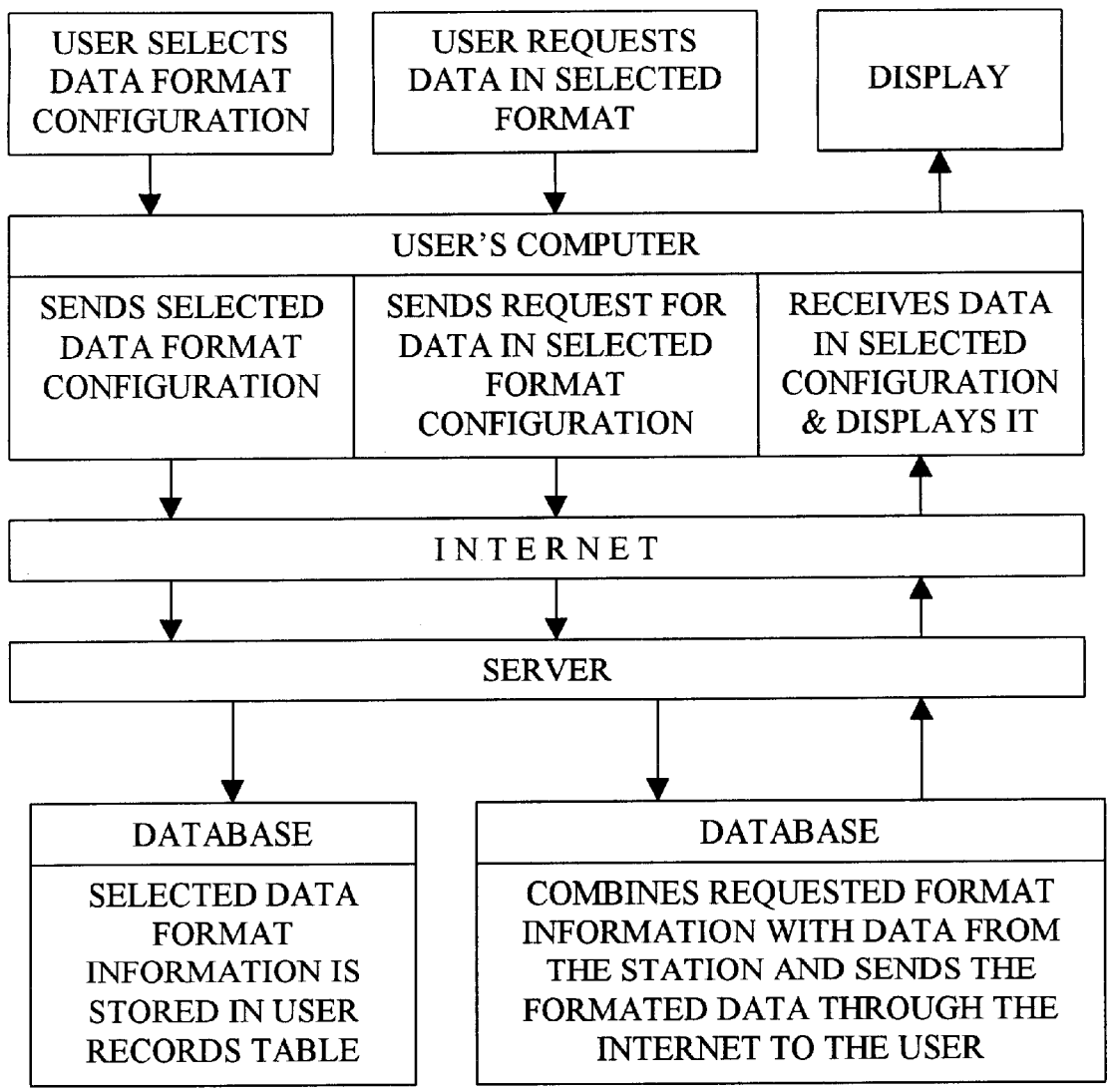

FIG. 17 is a flow chart that shows how the user selects his desired data format configuration using the system of FIG. 14 and sends it to the user records table within the database system. The middle and right side show the flow from the user's request for data, formatted to his selected requirements, to the server and database that returns the data and displays it in his selected format configuration.

The preferred embodiments of the invention described herein are exemplary and numerous modifications, dimensional variations, and rearrangements can be readily envisioned to achieve an equivalent result, all of which are intended to be embraced within the scope of the appended claims.

We claim:

1. A method for monitoring equipment, comprising:

providing at least one cellular equipment monitoring and weather station having:
    a data to radio frequency conversion system;
    at least one equipment sensor; and,
    a computer having a memory and a collection program;

providing a public cellular telephone system;

placing said at least one cellular weather station in an area served by said public cellular telephone system;

using said collection program to collect equipment information data from said at least one equipment sensor and compiling said equipment information data into at least one equipment data string and storing said at least one equipment data string in said memory;

providing a server system having a data base and a compilation program;

providing an Internet network;

coupling said public cellular telephone system and said server system to said Internet network;

said at least one cellular weather station periodically sending said at least one equipment data string by means of said data to radio frequency conversion system and said public cellular telephone system through said Internet network to said data base;

providing a personal computer having a display means;

coupling said personal computer to said Internet network;

using said personal computer to provide a user's equipment configurations to said server system through said Internet network; and, said server system combining said user's equipment configurations with said equipment information in said data base to create equipment control information and displaying said equipment control information on said personal computer display means.

2. The method of claim 1, wherein said step of providing a personal computer having a display means includes said display means having a means to query said server system to call said at least one cellular equipment monitoring and weather station for equipment information and displaying the equipment information, further including:

said means to query calling said server system;

said server system calling said at least one cellular equipment monitoring and weather station; and, said at least one cellular equipment monitoring and weather station sending said equipment information; and, said display means displaying said equipment information.

3. The method of claim 1, further including:

said step of providing a server system having a station access system:

said station access system periodically calling said portable cellular equipment monitoring and weather station through said Internet network and public cellular telephone network; and, said at least one cellular equipment monitoring and weather station sending said at least one equipment information data string in response to said call.

4. A cellular equipment monitoring and weather station and computer system using the public cellular telephone system and the Internet network for controlling irrigation, comprising:

at least one cellular equipment monitoring and weather station having:

a data to radio frequency conversion system;

at least one equipment sensor; and, a computer having a memory and a collection program for collecting equipment information data from said at least one sensor and compiling said equipment information data into at least one equipment information data string and storing said at least one equipment information data string in said memory;

a public cellular telephone system;

a server system having a data base and a compilation program;

an Internet network coupled to said server system and said public cellular telephone system;

said at least one cellular weather station for periodically sending said at least one equipment information data string by means of said data to radio frequency conversion system and said public cellar telephone system through said Internet network to said data base;

a personal computer having a display means and coupled to said Internet network for entering a user's equipment configurations in said server system through said Internet network; and, said server system for combining said user's equipment configurations with said equipment information in said data base to create equipment control information and displaying said equipment control information on said personal computer display means.

5. The system of claim 4, wherein said personal computer display means has a means to query said server system to call said at least one cellular equipment monitoring and weather station for equipment information and displaying the equipment information.

6. The system of claim 4, further including said server system having a station access system for periodically calling said portable cellular equipment monitoring and weather station through said Internet network and public cellular telephone network and said at least one cellular equipment monitoring and weather station sending said at least one equipment information data string in response to said call.

* * * * *